United States Patent [19]

Noah et al.

[11] Patent Number: 5,234,070

[45] Date of Patent: Aug. 10, 1993

[54] AUTOMATIC VEHICLE STEERING APPARATUS

[75] Inventors: Bruce C. Noah, W. Lafayette; William L. Callahan, Lafayette, both of Ind.

[73] Assignee: TRW Inc., Lyndhurst, Ohio

[21] Appl. No.: 660,665

[22] Filed: Feb. 25, 1991

[51] Int. Cl.$^5$ ............................................. B62D 1/28
[52] U.S. Cl. ................................... 180/169; 180/131; 180/142; 364/424.07
[58] Field of Search ............... 180/131, 133, 142, 169, 180/142, 167; 364/424.02, 424.07

[56] References Cited

U.S. PATENT DOCUMENTS

| | | | |
|---|---|---|---|
| 3,946,825 | 3/1976 | Gail | 180/131 |
| 4,155,417 | 5/1979 | Ziems | 180/167 |
| 4,219,093 | 8/1980 | Lang | 180/131 |
| 4,406,232 | 9/1983 | Fasse et al. | 180/131 X |
| 4,414,903 | 11/1983 | Fasse et al. | 180/131 X |
| 4,657,087 | 4/1987 | Liveneh | 180/131 X |
| 4,736,811 | 4/1988 | Marsden et al. | |
| 4,803,415 | 2/1989 | Sepsey | 180/140 X |
| 4,967,362 | 10/1990 | Shutten et al. | 364/424.07 |
| 5,048,630 | 9/1991 | Schaffer | 180/142 |

OTHER PUBLICATIONS

SAE Technical Paper Entitled Automatic Electronic Steering-A New Approach.

Primary Examiner—Karin L. Tyson
Assistant Examiner—Kevin Hurley
Attorney, Agent, or Firm—Tarolli, Sundheim & Covell

[57] ABSTRACT

A vehicle is operable in either one of two modes to control the turning of steerable vehicle wheels. During operation of the vehicle in a manual steering mode, the steerable vehicle wheels are turned in response to rotation of a steering wheel. During operation of the vehicle in an automatic steering mode, the steerable vehicle wheels are turned to maintain a predetermined relationship between the vehicle and a reference during movement of the vehicle relative to the reference. Upon initiation of operation of the vehicle in either of the two steering modes, a valve assembly is operated from an initial condition to either one of two actuated conditions to effect turning movement of the steerable vehicle wheels toward either the left or the right. During the manual steering mode, the valve assembly is operated in response to rotation of the vehicle steering wheel. During the automatic steering mode, the relationship of a vehicle to the reference outside of the vehicle is sensed and the valve assembly is operated independently of the steering wheel to maintain a predetermined relationship between the vehicle and the reference as the vehicle moves relative to the reference.

21 Claims, 4 Drawing Sheets

AUTOMATIC VEHICLE STEERING APPARATUS

BACKGROUND OF THE INVENTION

The present invention relates to a new and improved apparatus for controlling turning movement of steerable vehicle wheels.

It has previously been suggested that steerable wheels of a crop harvesting vehicle be controlled in response to either manual rotation of a steering wheel or changes in a sensed relationship of the vehicle to an edge of a crop grown in a row planted plot or otherwise distinguishable from the surrounding vegetation. During steering of the vehicle in response to manual rotation of the steering wheel, an electronic control unit is operable to actuate a steering control valve to direct high pressure fluid to a power steering motor. During automatic steering of the vehicle in response to changes in the relationship of the vehicle to a crop, the electronic control unit is operable to actuate the steering control valve in response to a sensor unit.

During automatic steering of the vehicle, the sensor unit continuously measures the distance from the vehicle to an edge of the crop plot. The output from the sensor unit is transmitted to the electronic control unit. In response to the output from the sensor unit, the electronic control unit effects operation of the steering control valve to turn the steerable vehicle wheels to maintain a constant relationship between the vehicle and a portion of the crop to be harvested as the vehicle moves forward.

SUMMARY OF THE INVENTION

A new and improved vehicle steering apparatus includes a fluid motor which is operable to turn steerable vehicle wheels. A valve assembly is operable from an initial condition to either a first actuated condition or a second actuated condition to control the direction of operation of the fluid motor and turning movement of steerable vehicle wheels. A metering unit provides a metered flow of fluid. In some embodiments of the invention, the metered fluid flow operates the valve assembly. In some embodiments of the invention, the metered fluid flow operates the fluid motor.

During manual steering operations, the valve assembly is actuated in response to rotation of the vehicle steering wheel. During automatic steering operations, a control assembly senses a relationship of the vehicle relative to a reference feature of the crop plot or other reference outside of the vehicle and effects actuation of the valve assembly. The control assembly effects actuation of the valve assembly in such a manner as to operate the fluid motor to maintain the desired relationship between the vehicle and the crop.

In some embodiments of the invention, the valve assembly includes a valve member which is movable under either the influence of fluid pressure or an electrically actuated solenoid. During manual steering operations, fluid pressure effects movement of the valve member. During automatic steering operations, the valve member is moved by the electrical solenoid.

BRIEF DESCRIPTION OF THE DRAWINGS

The foregoing and other features of the present invention will become more apparent upon a consideration of the following description taken in connection with the accompanying drawings, wherein.

DESCRIPTION OF SPECIFIC PREFERRED EMBODIMENTS OF THE INVENTION

Figure 1:
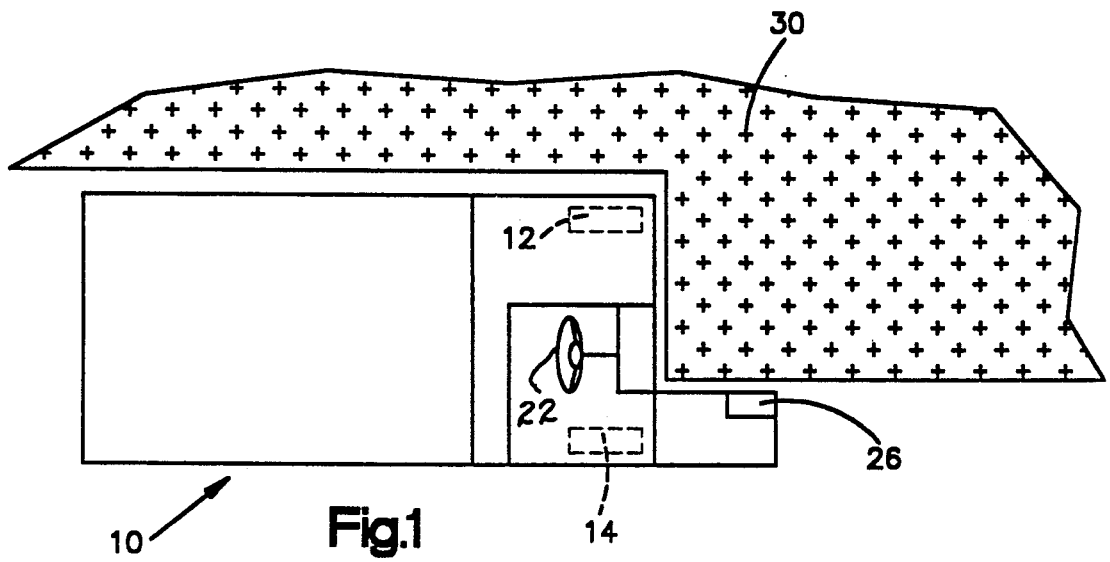
FIG. 1 is a schematic illustration depicting a vehicle having a steering apparatus constructed in accordance with the present invention.
Figure 2:
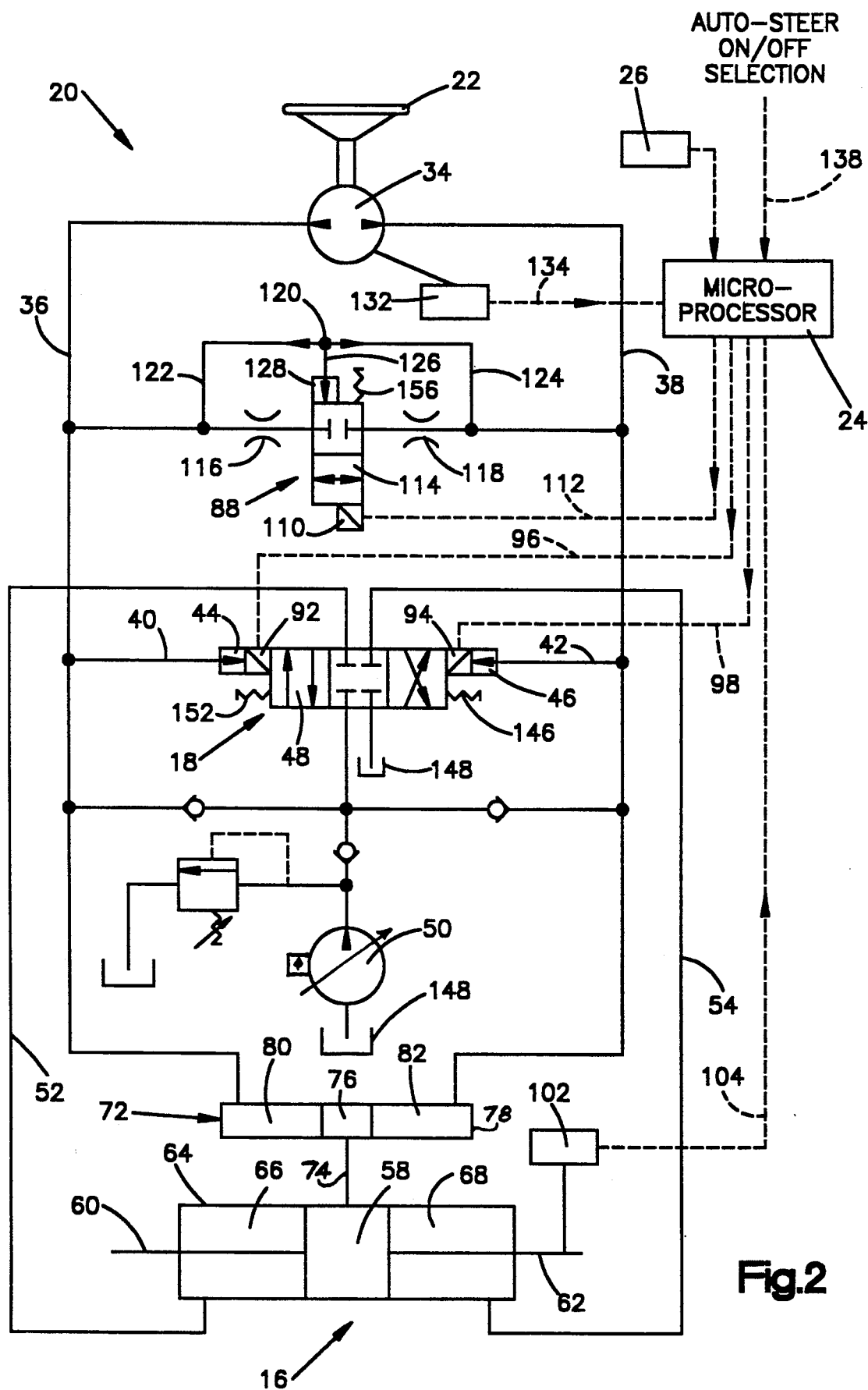
FIG. 2 is a schematic illustration of a steering apparatus used on the vehicle of FIG. 1 to control turning movement of steerable vehicle wheels.

A vehicle 10 (FIG. 1) has steerable wheels 12 and 14 which are connected with a power steering motor 16 (FIG. 2). A steering valve assembly 18 is operable from the initial condition shown in FIG. 2 to effect operation of the power steering motor 16 to turn the steerable vehicle wheels 12 and 14 to the left or to the right. The power steering motor 16 is a Deere & Co. Part No. RE27412. The steering valve assembly 18 is a Deere & Co. Part No. AR90611 modified by the addition of solenoid actuators.

A steering control apparatus 20 (FIG. 2) can be operated in either a manual steering mode or an automatic steering mode. When the steering control apparatus 20 is operating in the manual steering mode, the steering valve assembly 18 is actuated in response to rotation of a steering wheel 22. When the steering control apparatus 20 is operating in the automatic steering mode, the steering control valve 18 is operated by an electric solenoid 92 or 94 which receives electric power that is controlled by a microprocessor or microprocessor based electronic control unit 24 in response to a sensor 26 detecting a change in the relationship of the vehicle 10 to a reference. The microprocessor 24 should have eight bits or more RAM with an on-board analog-to-digital converter, such as a Motorola 6805R2 microprocessor.

The specific vehicle 10 illustrated in FIG. 1 is a harvesting machine and is used to harvest a crop 30 of corn. Therefore, the sensor 26 detects changes in the relationship of the vehicle 10 relative to an external row of the corn crop plot 30. However, it should be understood that the steering control apparatus 20 (FIG. 2 could be used in association with many different types of vehicles and crops.

The sensor 26 could be used to maintain a predetermined relationship between the vehicle and many different types of references which are outside of the vehicle. For example, the sensor 26 could be used to sense the relationship of the vehicle to a fence, ditch, pipe or many other things in the environment around the vehicle. The sensor 26 is of the known ultrasonic type sold by Amerace Corporation, under the trademark "Agastat", and is designated as Part No. PLEB S2AQ DLXX 4TX. The sensor could be of the feeler arm or limit switch type, buried wire sensing type, infrared reflection sensing type, or radio controlled type.

The steering wheel 22 (FIG. 2) is connected with a metering pump 34. The metering pump 34 is a Deere & Co. Part No. RE33972 pump or may be another metering pump of known construction. The metering pump 34 is connected with opposite ends of the steering valve assembly 18 by a pair of main conduits 36 and 38 and a pair of branch conduits 40 and 42. The branch conduits 40 and 42 are connected with actuator chambers 44 and 46 at opposite ends of the steering valve assembly 18.

Fluid pressure in the actuator chamber 44 moves a valve spool 48 from the initial condition shown in FIG. 2 to its first actuated condition directing high pressure fluid from a main supply pump 50 to a motor conduit 52. Similarly, fluid pressure in the actuator chamber 46 effects movement of the valve spool 48 to port fluid from the main supply pump 50 to a motor conduit 54 connected with the power steering motor 16. The main supply pump 50 is a pressure compensated pump, Deere & Co. Part No. AR94660.

The steering valve assembly 18 is of the pressure modulating type. Thus, the greater the fluid pressure in an actuator chamber 44 or 46, the less the steering valve assembly 18 restricts fluid flow through the steering valve assembly. This enables the steering valve assembly 18 to modulate the fluid pressure conducted to the power steering motor 16.

The power steering motor 16 is a double acting, equal area piston hydraulic ram, sold by Deere & Co. as Part No. RE27412. The power steering motor includes a piston 58. The piston 58 is connected with steerable vehicle wheels 12 and 14 by a pair of piston rods 60 and 62. The power steering motor piston 58 cooperates with a motor cylinder 64 to form a pair of motor cylinder chambers 66 and 68.

The power steering motor piston 58 is connected with a feedback assembly 72 (FIG. 2) by a connector member 74. The feedback assembly 72 is a part of Deere & Co.'s product sold as Part No. RE27412. The connector member 74 is connected with a piston 76 disposed in a feedback cylinder 78. The piston 76 divides the feedback cylinder 78 into a pair of hydraulic chambers 80 and 82.

The chambers 80 and 82 in the feedback assembly 72 are connected with the main conduits 36 and 38. A vent valve assembly 88 is connected between conduits 36, 38. When the vent valve assembly 88 is in a closed condition, the vent valve assembly 88 blocks fluid flow between the main conduits 36 and 38 through the vent valve assembly. Therefore, fluid flow is conducted through the main conduits 36 and 38 between the metering pump 34 and the cylinder chambers 80 and 82 in the feedback assembly 72 during operation of the power steering motor 16. The vent valve assembly 88 is a Vickers SV4-10-C-12D modified to add actuator chambers 44 and 46.

When the vent valve assembly 88 is open, the metering pump 34 is short circuited. Therefore, fluid flow is conducted between the feedback cylinder chambers 80 and 82 through the main conduits 36 and 38 and the open vent valve assembly 88 during operation of the power steering motor 16.

When the steering control apparatus 20 is being operated in the automatic steering mode, the microprocessor 24 controls operation of the steering valve assembly 18. Thus, the microprocessor 24 is connected with the solenoids 92 and 94 at opposite ends of the steering valve assembly 18. The solenoids 92 and 94 are connected with the valve spool 48. The solenoids 92 and 94 are Lucas/Ledex Part No. 160041-004.

The solenoid 92 is energizeable to effect movement of the valve spool 48 toward the right from the initial energizeable to effect movement of the valve spool 48 toward the left from the initial position shown in FIG. 2. The solenoids 92 and 94 are connected with the microprocessor 24 by electrical leads which have been indicated schematically at 96 and 98 (FIG. 2).

The electrical current conducted through the solenoid 92 or 94 can be varied by the microprocessor 24 to cause the steering control valve 18 to modulate the fluid pressure conducted to the power steering motor 16. Thus, the greater the current conducted to the solenoid 92 or 94, the less the steering control valve 18 restricts fluid flow to the power steering motor 16.

A signal generator 102 is connected with the power steering motor 16 and the microprocessor 24. The signal generator 102 provides an output signal which is transmitted over a lead, indicated schematically at 104 in FIG. 2, to the microprocessor 24. The signal transmitted from the signal generator 102 to the microprocessor 24 indicates the position of the steerable vehicle wheels 12 and 14 relative to the vehicle 10. The signal generator 102 is a Systron Donner (Duncan Electronics Division) 9800 series throttle position sensor and may be attached to a kingpin of the vehicle.

The microprocessor 24 is connected with a vent valve solenoid 110 by an electrical lead 112. The vent valve solenoid 110 is operable to move a vent valve spool 114 to an actuated condition connecting the main conduits 36 and 38 in fluid communication through orifices 116 and 118. A shuttle check valve assembly 120 is connected with conduits 122 and 124 and with a conduit 126. The conduit 126 is connected with a vent valve actuator chamber 128. The shuttle check valve assembly 120 is a Sun Hydraulics Part No. CSAB-XXN.

If the steering wheel 22 is manually rotated during operation of the steering control apparatus 20 in the automatic steering mode, a signal generator 132 provides an output signal to the microprocessor 124 over a lead 134. The signal generator 132 may be a potentiometer having infinite rotation capability, such as a Systron Donner Model 1221. The microprocessor 24 is connected with an on/off selector switch (not shown) by a lead 138.

During operation of the steering control apparatus 20 in the manual steering mode, the on/off selector switch (not shown) is actuated to the off condition. This effectively disconnects the microprocessor 24 from the steering valve assembly 18 and vent valve assembly 88. Therefore, the solenoid 110 is de-energized and the vent valve assembly 88 is biased to in the closed condition illustrated in FIG. 2 by the valve spring 156. When the vent valve assembly 88 is in the closed condition, fluid flow through the vent valve spool 114 is blocked.

Upon manual rotation of the steering wheel 22, the metering pump 34 is operated to increase the fluid pressure in one of the two main conduits 36 and 38. Assuming that the direction of rotation of the steering wheel 22 is such as to increase the fluid pressure in the main conduit 36, this fluid pressure is conducted through the branch conduit 40 to the actuator chamber 44. The fluid pressure in the actuator chamber 44 moves the valve spool 48 rightwardly (as viewed in FIG. 2) from the initial position against the influence of a biasing spring 146.

Actuation of the steering valve assembly 18 directs high pressure fluid from the pump 50 to the motor conduit 52 and connects the motor conduit 54 with drain or reservoir 148. Relatively high fluid pressure is conducted from the motor conduit 52 to the motor cylinder chamber 66. Since the motor cylinder chamber 68 is connected with reservoir 148 through the steering valve assembly 18, the high fluid pressure in the motor cylinder chamber 66 moves the power steering motor piston 58 toward the right (as viewed in FIG. 2). Rightward movement of the piston 58 moves the piston rods 60 and 62 to turn the steerable vehicle wheels.

As the power steering motor piston 58 moves toward the right (as viewed in FIG. 2), the piston 76 in the feedback assembly 72 is moved toward the right. This results in fluid being discharged from the chamber 82 of the feedback assembly 72 to the main conduit 38. At the same time, the fluid flows from the metering pump 34 through the main conduit 36 into the chamber 80 of the feedback assembly.

When the operator interrupts rotation of the steering wheel 22, the power steering motor 16 will have been operated to an extent corresponding to the extent of rotation of the steering wheel 22. When the operator interrupts rotation of the steering wheel 22, the inertia of the pistons 58 and 76 of the power steering motor 16 and feedback assembly 72 effect a reduction in the fluid pressure in the main conduit 36 and an increase in the fluid pressure in the main conduit 38.

The reduction in fluid pressure in the main conduit 36 is transmitted through the branch conduit 40 to the actuator chamber 44 in the steering valve assembly 18. The increase in fluid pressure in the main conduit 38 is transmitted through the branch conduit 42 to the actuator chamber 46 in the steering valve assembly 18. As the difference between fluid pressures in the steering valve actuator chambers 44 and 46 approaches zero, the biasing spring 146 moves the valve spool 48 back to the initial position shown in FIG. 2.

When the valve spool 48 has returned to the initial position shown in FIG. 2, fluid flow to and from the power steering motor 16 is blocked. This interrupts operation of the power steering motor 16. With the interruption of operation of the power steering motor 16, operation of the feedback assembly 72 is also interrupted.

If the steering wheel 22 is rotated in the opposite direction, the metering pump 34 directs relatively high pressure fluid to the main conduit 38. This high pressure fluid is conducted through the branch conduit 42 to the actuator chamber 46 in the steering valve assembly 18. Fluid pressure in the actuator chamber 46 moves the valve spool 48 toward the left (as viewed in FIG. 2) against the influence of a biasing spring 152. This actuates the steering valve assembly 18 to direct fluid pressure from the main supply pump 50 to the motor conduit 54 and to connect the motor conduit 52 to the reservoir 148.

The relatively high fluid pressure in the motor conduit 54 is conducted to the motor cylinder chamber 68 to actuate the power steering motor 16. Upon actuation of the power steering motor 16, the steerable vehicle wheels 12 and 14 are turned.

The feedback assembly 72 is also actuated with the power steering motor 16. Therefore, the piston 76 in the feedback assembly 72 moves toward the left (as viewed in FIG. 2) with the power steering motor piston 78 to discharge fluid from the feedback cylinder chamber 80 to the main conduit 36. Fluid flows from the main conduit 36 through the metering pump 34 to the main conduit 38 and the expanding feedback chamber 82.

During operation of the power steering motor 16 in response to manual rotation of the steering wheel 22, the vent valve assembly 88 is biased closed by valve spring 156. Thus, when there is relatively high fluid pressure in the main conduit 36, this relatively high fluid pressure is transmitted through the conduit 122, the shuttle check valve assembly 120 to the conduit 126. The fluid pressure in the conduit 126 is transmitted to the actuator chamber 128 to maintain the vent valve assembly 88 in the closed condition. Similarly, when there is relatively high fluid pressure in the main conduit 38, this high fluid pressure is transmitted through the conduit 124 and shuttle check valve assembly 120 to the actuator chamber 128 to bias the vent valve assembly 88 closed.

When the vehicle 10 is to be operated in the automatic steering mode, the on/off selector switch (not shown) is actuated to transmit a signal over the lead 138 to the microprocessor 24. This signal activates the microprocessor 24 to assume control of the steering control apparatus 20. As the vehicle 10 continues to move relative to a reference outside of the vehicle, for example, the crop 30 (FIG. 1), the sensor 26 detects changes in the relationship between the vehicle and the crop. The sensor 26 is an ultrasonic sensor which measures the distance from the vehicle to the edge of the crop. The raw sensor signal is filtered by a digital circuit (not shown) that throws out or eliminates high and low readings and averages the remainder. However, any known type of autosteer sensor that generates an analog output signal could be used.

It is preferred to have the analog output signal from the sensor 26 be smaller than the range of the supplied power. Thus, if the range of supplied power is 0 to 5 volts, the range of the analog output signal may be from 0.5 volts to 4.5 volts. If the microprocessor 24 receives a signal of 0 volts or 5.0 volts, the microprocessor will detect the occurrence of a malfunction. Of course, other ranges of voltage could be used if desired.

As soon as the automatic steering mode is undertaken, the microprocessor 24 transmits a signal over the lead 112 to energize the vent valve solenoid 110. The energized vent valve solenoid 110 actuates the vent valve assembly 88 against the influence of the biasing spring 156. Actuation of the vent valve assembly 88 connects main conduits 36 and 38 in fluid communication with each other to render the metering pump 34 ineffective.

When a signal from the sensor 26 indicates that the relationship between the vehicle 10 and a crop 30 has changed from the desired relationship, the microprocessor 24 effects operation of the steering valve assembly 18 to turn steerable wheels 12 and 14 of the vehicle 10. For example, when the steerable vehicle wheels are to be turned in one direction, a signal is transmitted over a lead 96 to energize solenoid 92. Energization of the solenoid 92 moves the valve spool 48 toward the right from the initial position shown in FIG. 2 against the influence of the biasing spring 146. Actuation of the steering valve assembly 18 ports fluid pressure from the main supply pump 50 to the motor conduit 52 and the motor cylinder chamber 66. At the same time, the motor cylinder chamber 68 is connected with the reservoir 148 through the actuated steering valve assembly 18. Of course, this effects turning movement of the steerable vehicle wheels 12 and 14.

As the power steering motor 16 is actuated, the feedback assembly 72 is also actuated. Thus, the piston 76 in the feedback assembly 72 causes fluid to flow from the chamber 82 into the main conduit 38. Since the vent valve assembly 88 is actuated, the fluid flows through the vent valve assembly into the opposite chamber 80 of the feedback assembly 72. Therefore, during operation of the steering control apparatus 20 in the automatic steering mode, the feedback assembly 72 is ineffective to perform a control function.

During operation of the power steering motor 16, the signal generator 102 provides an output signal which is transmitted over a lead 104 to the microprocessor 24. The output signal from the signal generator 102 indicates the extent of turning movement of the steerable vehicle wheels 12 and 14. Once the vehicle is turned by an amount sufficient to correct the error detected by the sensor 26, the microprocessor 24 de-energizes the solenoid 92. This allows the valve spool 48 to be returned to the initial position shown in FIG. 1 by the biasing spring 146 to thereby interrupt the steering operation.

When the sensor 26 detects that the vehicle 10 is to be turned in the opposite direction in order to maintain a desired relationship with the crop 30, the microprocessor 24 transmits a signal over the lead 98. This signal energizes the solenoid 94 to move the valve spool 48 against the influence of the biasing spring 152. This movement of the valve spool 48 directs high pressure fluid from the main supply pump 50 to the motor conduit 54 and the motor cylinder chamber 68. At the same time, the motor conduit 52 and motor cylinder chamber 66 are connected with the reservoir 148.

The power steering motor 16 is operated to turn the steerable vehicle wheels 12 and 14. This turning movement of the steerable wheels results in an output signal from the signal generator 102 to the microprocessor 24. When the steerable vehicle wheels 12 and 14 have been turned to an extent sufficient to return the vehicle 10 to the desired relationship relative to the crop 30, the solenoid 94 is de-energized. The biasing spring 152 then returns the steering valve assembly 18 to the initial condition shown in FIG. 2.

If the steering wheel 22 is manually turned during operation of the steering control apparatus 20 in the automatic steering mode, the automatic steering mode is interrupted and control of the vehicle is returned to the manual steering mode. Thus, upon rotation of the steering wheel 22 during operation of the steering control apparatus 20 in the automatic steering mode, an output signal is provided by the signal generator 132. This output signal is transmitted to the microprocessor 24 over the lead 134. In response to an output signal from the signal generator 132, the microprocessor 24 immediately de-energizes the vent valve solenoid 110 and one of the two steering valve solenoids 92 or 94 which may be energized. This results in the steering control apparatus 20 again being actuated in the manual steering mode in response to rotation of the steering wheel 22.

If for some reason the microprocessor 24 should malfunction and fail to de-energize the solenoid 110 upon manual rotation of the steering wheel 22, the vent valve assembly 88 is actuated from the open condition to the closed condition by the valve spring 156 and fluid pressure from the metering pump 34. Thus, depending upon the direction of operation of the metering pump 34, the fluid pressure in a main conduit 36 or 38 increases with a resulting increase in the fluid pressure ahead of one of the orifices 116 or 118. This increased fluid pressure is transmitted to he shuttle check valve assembly 120 through one of the conduits 122 or 124. The relatively high fluid pressure is transmitted to the vent valve actuator chamber 128 through the conduit 126. The fluid pressure in the vent valve actuator chamber 128 assists the spring 156 to close the vent valve assembly 88 against the influence of the solenoid 110.

For example, a malfunction could result in the solenoid 110 remaining energized to maintain the vent valve assembly 88 open upon initiation of rotation of the steering wheel 22 to operate the metering pump 34 to pump fluid into the main conduit 36. Even though the vent valve assembly 88 is in the open condition, the fluid pressure ahead of the orifice 116 will increase. This increased fluid pressure is conducted through the conduit 122 and shuttle check valve assembly 120 to the vent valve actuator chamber 128. The increased fluid pressure in the vent valve actuator chamber 128 assists the valve spring in actuating the vent valve assembly 88 to the closed condition.

Figure 3:
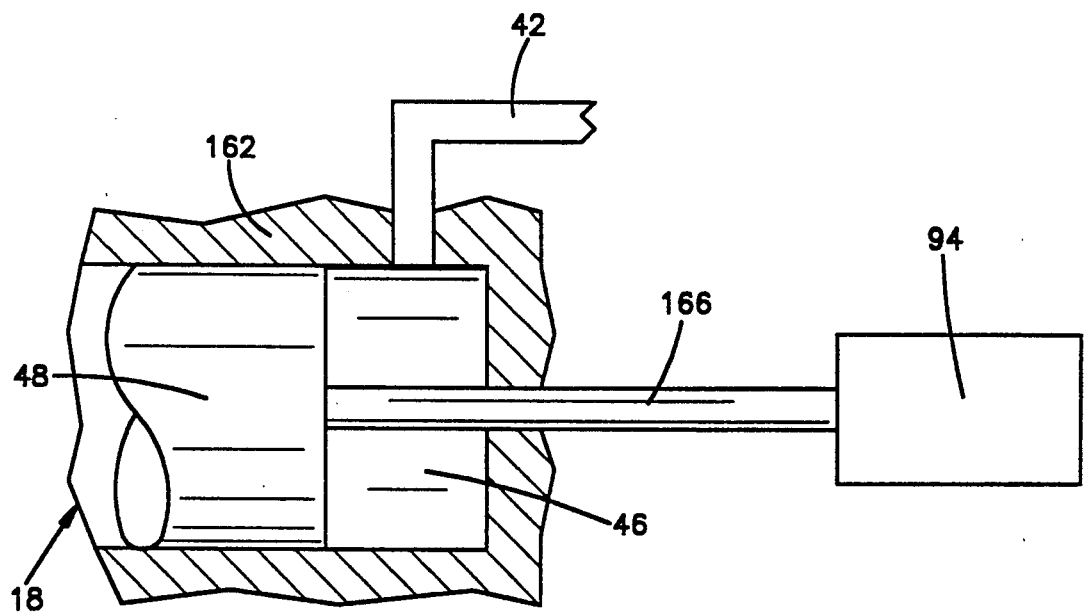
FIG. 3 is a fragmentary schematic illustration of a portion of a valve assembly used in the steering control apparatus of FIG. 2.

The manner in which the steering valve assembly 18 can be actuated by either the solenoid 94 or fluid pressure conducted to the actuator chamber 46 through the branch conduit 42 is illustrated in FIG. 3. Thus, in the embodiment of the steering valve assembly 18 illustrated in FIG. 3, the valve spool 48 cooperates with a housing 162 to form the actuator chamber 46. High pressure fluid in the actuator chamber 46 is effective to move the valve spool 48 toward the left (as viewed in FIG. 3).

The solenoid 94 includes a central rod or core 166 which is connected to the valve spool 48. Upon energization of the solenoid 94, the rod 166 moves the valve spool 48 toward the left (as viewed in FIG. 3). Although only the solenoid 94 and actuator chamber 46 at the right (as viewed in FIG. 2) end of the valve spool 48 have been shown in FIG. 3, it should be understood that the solenoid 92 and actuator chamber 44 cooperate with the valve spool 48 in the same manner as do the solenoid 94 and actuator chamber 46. Therefore, the steering valve assembly 18 can be actuated from the initial position to either one of two actuated positions in response to either fluid pressure in one of the actuator chambers 44 and 46 or energization of one of the electrical solenoids 92 and 94.

Figure 4:
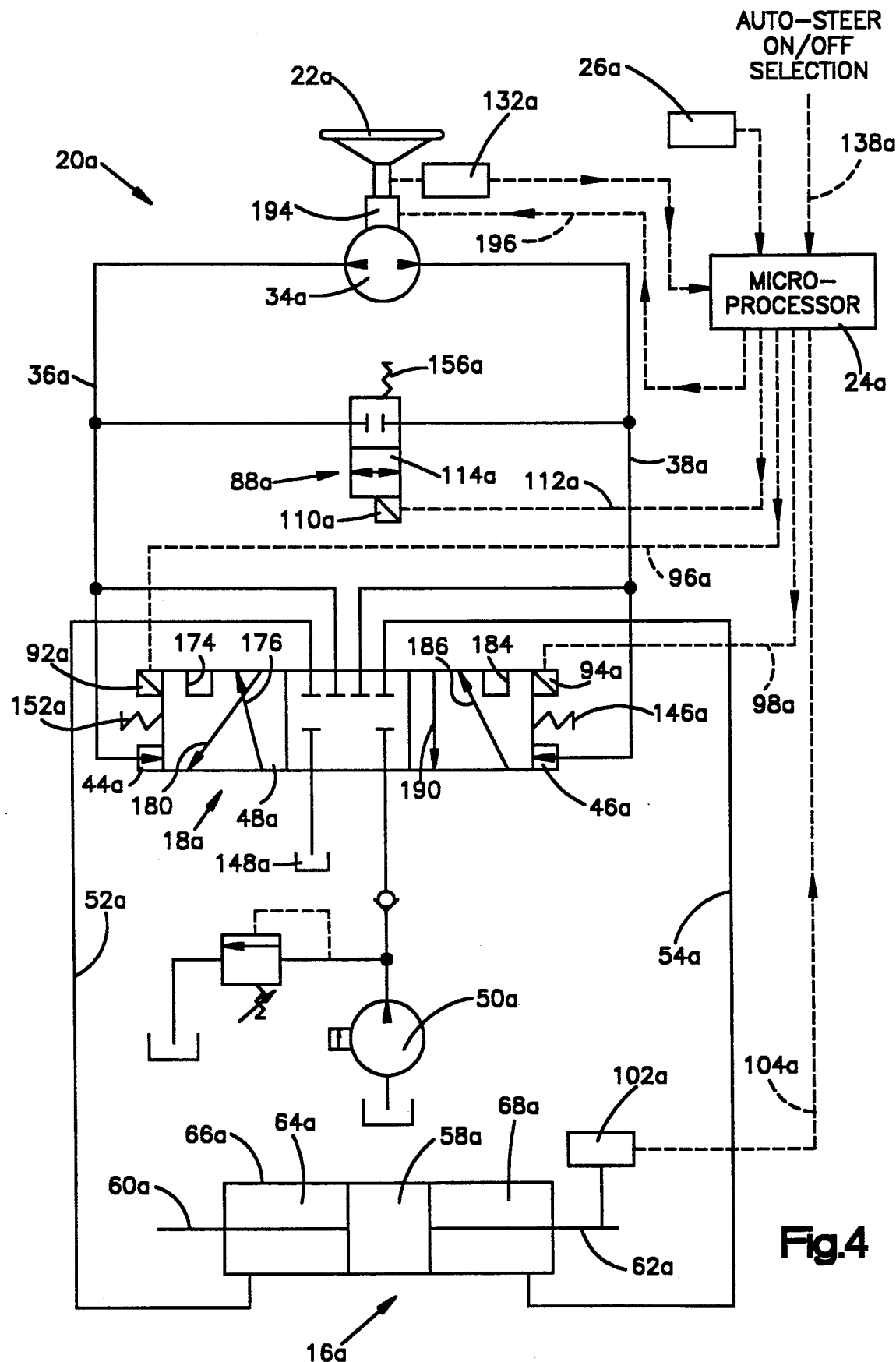
FIG. 4 is a schematic illustration, generally similar to FIG. 2, illustrating a second embodiment of the steering control apparatus.

In the embodiment of the invention illustrated in FIG. 2, the fluid which is conducted to the power steering motor 16 does not pass through the metering pump 34. Only the fluid from the feedback assembly 72 passes through the metering pump 34 in this embodiment of the invention. In the embodiment of the invention illustrated in FIG. 4, all of the fluid flow to and from the power steering motor passes through the metering pump. Since the embodiment of the invention illustrated in FIG. 4 is generally similar to the embodiment of the invention illustrated in FIGS. 1-3, similar numerals will be utilized to designate similar components, the suffix letter "a" being associated with the numerals of FIG. 4 in order to avoid confusion.

A steering control apparatus 20a includes a vehicle steering wheel 22a which is connected with a metering pump 34a. The metering pump 34a is connected in fluid communication with main conduits 36a and 38a.

A steering valve assembly 18a includes actuator chambers 44a and 46a which are connected in fluid communication with the main conduits 36a and 38a. Fluid pressure in the actuator chamber 44a or 46a is effective to move a valve spool 48a from the initial position shown in FIG. 4 to either one of two actuated positions. Upon actuation of the steering valve assembly 18a, fluid flows from the steering valve assembly to the power steering motor 16a to effect turning movement of steerable vehicle wheels. The steering motor 16a may be any hydraulic cylinder capable of generating the force required to steer the vehicle, for example, a TRW Ross Gear Division C44 series cylinder.

During the automatic steering mode, the sensor 26a detects changes in the relationship of the vehicle to a reference outside of the vehicle, for example to a crop similar to the crop 30 of FIG. 1. The microprocessor or microprocessor based electronic control unit 24a is connected with the sensor 26a and with solenoids 92a and 94a which are operable to actuate the steering control valve 18a. A signal generator 102a provides an output signal to the microprocessor 24a during turning of the steerable vehicle wheels. In addition, a signal generator 132a provides an output signal to the microprocessor 24a to interrupt operation of the steering control apparatus 20a in the automatic steering mode in response to manual turning of the steering wheel 22a.

Upon actuation of the steering control valve 18a during operation of the steering control apparatus 20a in either the manual steering mode or the automatic steering mode, fluid flow from the metering pump 34a is conducted from the steering control valve 18a to the power steering motor 16a. The metering pump 34a is supplied with fluid conducted from the main supply pump 50a through the steering control valve 18a. Fluid discharged from the power steering motor 16a is conducted through the steering control valve 18a to reservoir 148a.

Upon rightward (as viewed in FIG. 4) movement of the valve spool 48a to an actuated position, motor conduit 52a is connected in fluid communication with the main conduit 36a through a valve passage 174. At this time, the main supply pump 50a is connected in fluid communication with the main conduit 38a through a valve passage 176. Therefore, high pressure fluid flows from the main supply pump 50a through the valve spool 48a to the metering pump 34a. This fluid then flows from the metering pump 34a through the main conduit 36a back to the steering control valve 18a. The fluid then flows through the valve passage 174 to the motor conduit 52a to effect operation of the power steering motor 16a. The motor cylinder chamber 68a is connected with reservoir through the motor conduit 54a and a valve passage 180.

When the steering control valve assembly 18a is actuated in the opposite direction, a valve passage 184 connects the main conduit 38a in fluid communication with the motor conduit 54a. Therefore, fluid is conducted from the metering pump 34a to the chamber 68a of the power steering motor 16a to effect operation of the power steering motor in the opposite direction. At this time, high pressure fluid is conducted from the main supply pump 50a through a valve passage 186 to the motor conduit 36a and the metering pump 34a. The motor conduit 52a is connected with the reservoir 148a through valve passage 190.

During operation of the steering control apparatus 20a in the automatic steering mode, a clutch 194 is disengaged. Disengagement of the clutch 194 enables the metering pump 34a to be actuated without rotating the steering wheel 22a. The microprocessor 24a effects disengagement of the clutch 194 by transmitting a signal over a lead 196 during operation of the steering control apparatus 28a in the automatic steering mode. Therefore, operation of the pump 34a does not effect rotation of the steering wheel 22a. The clutch 194 is a Carlyle Johnson Maxitorq 950FS or a Kebco Combinorm-C 03.130-13.

If the steering wheel 22a is rotated manually during operation of the steering control apparatus 20 in the automatic steering mode, a signal generator 132a provides an output signal to the microprocessor 24a. Upon receiving manual rotation of the steering wheel 22a has occurred during an automatic steering operation, the microprocessor 24a immediately interrupts the automatic steering operation. This results in the clutch 194 being re-engaged to transmit force from the steering wheel 22a to the metering pump 34a. Once the clutch 194 has been engaged, rotation of the steering wheel 22a causes the pump 34a to provide an output signal to the actuator chamber 44a or the actuator chamber 46a to effect operation of the steering control valve 18a.

Figure 5:
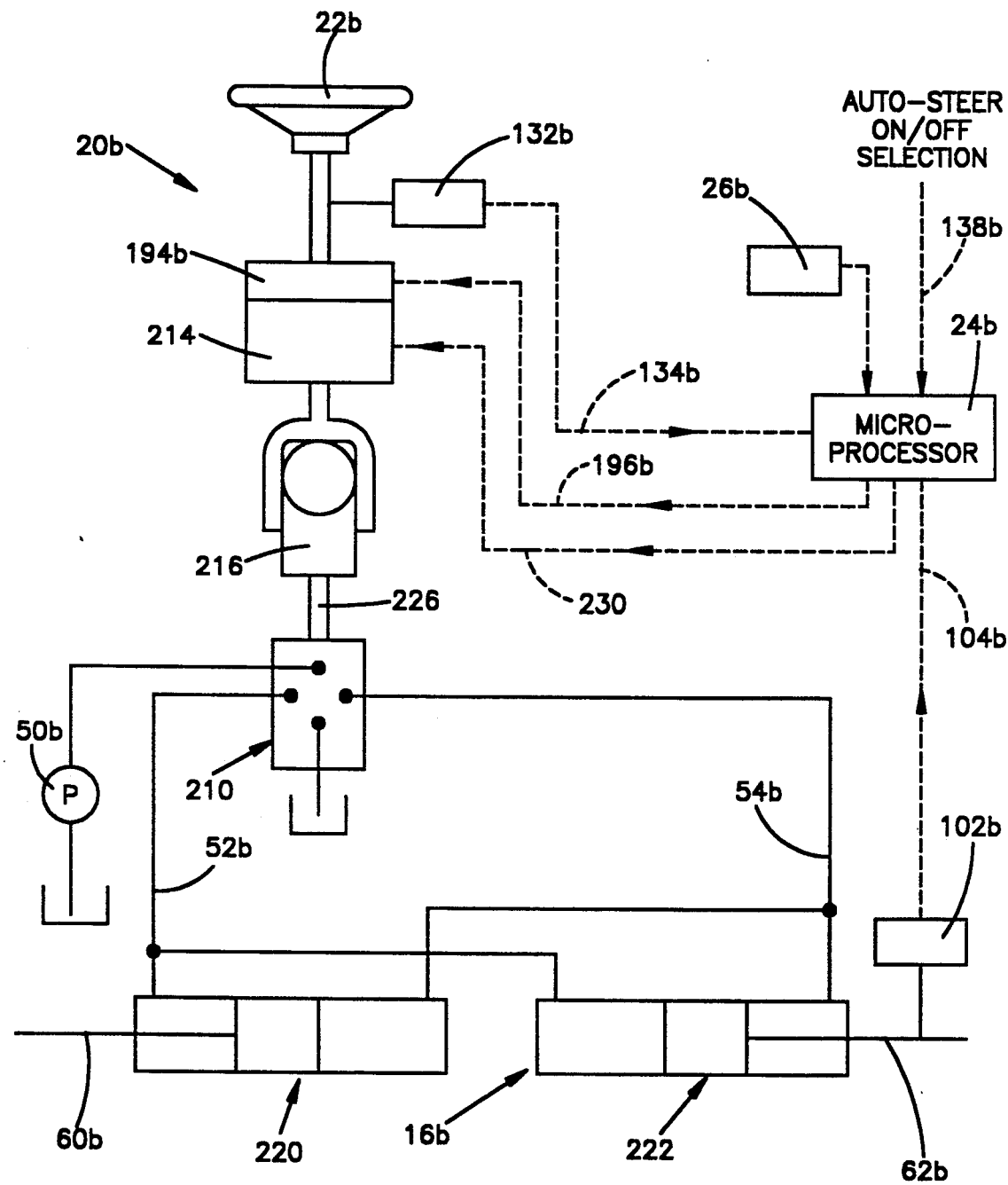
FIG. 5 is a schematic illustration, generally similar to FIGS. 2 and 4, illustrating the construction of another embodiment of the steering control apparatus.

In the embodiment of the invention illustrated in FIG. 5, the metering pump and power steering control valve are integrated into a single hydrostatic steering unit. Since the embodiment of the invention illustrated in FIG. 5 is generally similar to the embodiment of the invention illustrated in FIGS. 1-4, similar numerals will be utilized to designate similar components, the suffix letter "b" being associated with the components of the embodiment of the invention illustrated in FIG. 5 to avoid confusion.

In the embodiment of the invention illustrated in FIG. 5, the steering wheel 22b is connected with a hydrostatic steering unit 210 through a clutch 194b, stepper type electric motor 214 and universal joint 216. The electric motor 214 is a Globe Motors Model 400A6190-1 stepper type electric motor.

The hydrostatic steering unit 210 is connected with a power steering motor 16b. The power steering motor 16b includes a motor assembly 220 connected with one of the steerable vehicle wheels by a piston rod 60b and a motor assembly 222 connected with the other steerable vehicle wheel by a piston rod 62b. The motor assemblies 220 and 222 are connected in fluid communication with the hydrostatic steering unit by motor conduits 52b and 54b.

The hydrostatic steering unit 210 includes a power steering valve and a metering pump. The hydrostatic steering unit 210 includes a rotatable valve (not shown) connected to an input shaft 226. A metering unit or pump (not shown) is connected with the valve and meters fluid flow in the same manner as does the metering pump 34 (FIG. 2).

Upon rotation of the input shaft 226, the steering control valve is actuated to direct high pressure fluid from the main supply pump 50b to the metering unit. In addition, the steering control valve directs high pressure fluid from the metering unit to one of the motor conduits 52b or 54b to effect operation of the motor assemblies 220 and 222. Fluid discharged from the motor assemblies 220 and 220 is conducted back to the hydrostatic steering unit 210 through the motor conduit 52b or 54b which did not conduct high pressure fluid to the motor assemblies.

Although many known types of hydrostatic steering units 210 could be utilized if desired, in one specific embodiment of the invention, the hydrostatic steering unit 210 is a Ross Hydraguide Steering Model HGA which is commercially available from TRW Inc., Ross Gear Division, Lafayette, Ind. The hydrostatic steering unit 210 has a mode of operation which is generally similar to that disclosed in U.S. Pat. Nos. 3,385,057 and 3,452,543.

During operation of the steering control apparatus 20b in a manual steering mode, force resulting from manual rotation of the steering wheel 22b is transmitted through the engaged clutch 184b, the de-energized electric motor 214, and universal joint assembly 216 to the input shaft 226 of the hydrostatic steering unit 210. Rotation of the input shaft 226 actuates a steering control valve in the hydrostatic steering unit 210 in a known manner. Actuation of the steering control valve ports high pressure fluid to the motor assembly 220 and the motor assembly 222 to effect turning movement of the steerable vehicle wheels.

When the steering control apparatus 20b is to be operated in the automatic steering mode, a selector switch is actuated to transmit a signal over a lead 138b to the microprocessor or microprocessor based electronic control unit 24b. The microprocessor 24b transmits a signal over a lead 196b to disengage the clutch 194b.

When a sensor 26b detects that the relationship of the vehicle relative to a reference, such as a crop, does not correspond to a desired relationship, a signal is transmitted over a lead 230 to effect operation of the stepper type electric motor 214. Operation of the electric motor 214 rotates the input shaft 226 of the hydrostatic steering unit through an arcuate distance which corresponds to the extent of desired operation of the motor assemblies 220 and 222. Since the clutch 194b is disengaged, the steering wheel 22b is not rotated by the motor 214. Therefore, the motor 214 is operable to only actuate the hydrostatic steering unit 210.

If, during operation of the steering control apparatus 20b in the automatic steering mode, the steering wheel 22b is rotated, a signal generator 132b transmits a signal to the microprocessor 24b. In response to this signal, the microprocessor 24b effects operation of the clutch 194b to the engaged condition. At the same time, the microprocessor 24b de-energizes the electric motor 214. Once the clutch 194b has been engaged and the electric motor 214 de-energized, rotation of the steering wheel 24b is transmitted directly to the input shaft 226 of the hydrostatic steering unit 210 through the clutch 194b and electric motor 214.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus comprising:
   fluid motor mean for turning steerable vehicle wheels;
   valve means operable from an initial condition to a first actuated condition to effect operation of said fluid motor means in a first direction to turn the steerable vehicle wheels in one direction and operable from the initial condition to a second actuated condition to effect operation of said fluid motor means in a second direction opposite to the first direction to turn the steerable vehicle wheels in another direction;
   fluid metering means for providing a metered flow of fluid at a rate which is a function of the rate of rotation of the steering wheel to effect operation of said fluid motor means at a rate which is a function of the rate of rotation of the steering wheel;
   control means for sensing a relationship of the vehicle relative to a reference outside of the vehicle and for effecting actuation of said valve means between the initial condition and said first and second actuated conditions independently of the steering wheel to maintain a predetermined relationship between the vehicle and the reference during movement of the vehicle relative to the reference;
   and means for interrupting operation of said control means in response to rotation of the steering wheel during operation of said control means;
   said control means including electrically activated means for effecting actuation of said valve means.

2. A vehicle steering apparatus as set forth in claim 1 wherein said valve means includes a valve member, a first actuator chamber disposed adjacent to a first end portion of said valve member for receiving fluid pressure from said fluid metering means to effect movement of said valve member and operation of said valve means from the initial condition to the first actuated condition, and a second actuator chamber disposed adjacent to a second end portion of said valve member for receiving fluid pressure from said fluid metering means to effect movement of said valve member and operation of said valve means from the initial condition to the second actuated condition;
   said electrically activated means includes first electrical solenoid means disposed adjacent to the first end portion of said valve member and operable under the influence of said control means to effect movement of said valve member from the initial condition to one of said actuated conditions, and second electrical solenoid means disposed adjacent to the second end portion of said valve member and operable under the influence of said control means to effect movement of said valve member from the initial condition to another of said actuated conditions.

3. A vehicle steering apparatus as set forth in claim 1, wherein said valve means including a valve member, said valve member having an initial position during the initial condition of said valve means, said valve member being movable from the initial position to a first actuated position during operation of said valve means from the initial condition to the first actuated condition, said valve member being movable from the initial position to a second actuated position during operation of said valve means from the initial condition to the second actuated condition.

4. A vehicle steering apparatus as set forth in claim 1 including means for effecting operation of said valve means from an actuated condition to the initial condition in response to operation of said fluid motor means to an extent which is a function of the amount of metered fluid flow.

5. A vehicle steering apparatus as set forth in claim 1 further including stepper motor means for operating said valve means, said control means including means for effecting operation of said stepper motor means to operate said valve means.

6. A vehicle steering apparatus as set forth in claim 5 further including clutch means operable between an engaged condition connecting the steering wheel with said stepper motor means and a disengaged condition in which said clutch means is ineffective to connect the steering wheel with said stepper motor means, said valve means being operable between the initial condition and the first and second actuated conditions under the influence of force transmitted from the steering wheel through said clutch means and said stepper motor means when said clutch means is in the engaged condition.

7. A vehicle steering apparatus as set forth in claim 1 further including signal generator means connected with the steering wheel for providing an output signal in response to rotation of the steering wheel, said control means including means for rendering said control means ineffective to operate said valve means in response to a signal from said signal generator means.

8. A vehicle steering apparatus as set forth in claim 1 further including clutch means connected with said valve means and the steering wheel, said clutch means being operable between an engaged condition in which said clutch means is effective to transmit force between the steering wheel and said valve means and a disengaged condition in which said clutch means is ineffective to transmit force between the steering wheel and said valve means, said control means including means for maintaining said clutch means in the disengaged condition during operation of said control means to maintain the predetermined relationship between the vehicle and the reference.

9. A vehicle steering apparatus as set forth in claim 1 further including conduit means for conducting a flow of fluid from said fluid metering means to said fluid motor means during operation of said fluid motor means to turn the steerable vehicle wheels.

10. A vehicle steering apparatus comprising fluid motor means for turning steerable vehicle wheels, valve means operable from an initial condition to a first actuated condition to effect operation of said fluid motor means in a first direction to turn the steerable vehicle wheels in one direction and operable from the initial condition to a second actuated condition to effect operation of said fluid motor means in a second direction opposite to the first direction to turn the steerable vehicle wheels in another direction, stepper motor means for operating said valve means, clutch means operable between an engaged condition connecting the steering wheel with said stepper motor means and a disengaged condition in which said clutch means is ineffective to connect the steering wheel with said stepper motor means, said valve means being operable under the influence of force transmitted from the steering wheel through said clutch means and said stepper motor means when said clutch means is in the engaged condition, and control means for sensing a relationship of the vehicle relative to a reference outside of the vehicle and for effecting operation of said stepper motor means to operate said valve means when said clutch means is in the disengaged condition to maintain a predetermined relationship between the vehicle and the reference during movement of the vehicle relative to the reference.

11. A vehicle steering apparatus as set forth in claim 10 further including means for interrupting operation of said control means in response to rotation of the steering wheel during operation of said control means.

12. A vehicle steering apparatus as set forth in claim 10 further including fluid metering means for providing a metered flow of fluid to said fluid motor means at a rate which is a function of the rate of rotation of the steering wheel when said clutch means is in the engaged condition and for providing a metered flow of fluid to said fluid motor means at a rate which is a function of the rate of operation of said stepper motor means when said clutch means is in the disengaged condition.

13. A vehicle steering apparatus comprising fluid motor means for turning steerable vehicle wheels, valve means operable from an initial condition to a first actuated condition to effect operation of said fluid motor means in a first direction to turn the steerable vehicle wheels in one direction and operable from the initial condition to a second actuated condition to effect operation of said fluid motor means in a second direction opposite to the first direction to turn the steerable vehicle wheels in another direction, fluid metering means for providing a metered flow of fluid at a rate which is a function of the rate of rotation of the steering wheel to effect operation of said fluid motor means at a rate which is a function of the rate of rotation of the steering wheel, control means for sensing a relationship of the vehicle relative to a reference outside of the vehicle and for effecting actuation of said valve means between the initial condition and said first and second actuated conditions independently of the steering wheel to maintain a predetermined relationship between the vehicle and the reference during movement of the vehicle relative to the reference, and clutch means connected with said fluid metering means and the steering wheel, said clutch means being operable between an engaged condition in which said clutch means is effective to transmit force between the steering wheel and said fluid metering means and a disengaged condition in which said clutch means is ineffective to transmit force between the steering wheel and said fluid metering means, said control means including means for maintaining said clutch means in the disengaged condition during operation of said control means to maintain the predetermined relationship between the vehicle and the reference.

14. A vehicle steering apparatus comprising fluid motor means for turning steerable vehicle wheels, valve means operable from an initial condition to a first actuated condition to effect operation of said fluid motor means in a first direction to turn the steerable vehicle wheels in one direction and operable from the initial condition to a second actuated condition to effect operation of said fluid motor means in a second direction opposite to the first direction to turn the steerable vehicle wheels in another direction, said valve means including a valve member having opposite end portions, fluid metering means for providing a metered flow of fluid at a rate which is a function of the rate of rotation of the steering wheel to effect operation of said fluid motor means at a rate which is a function of the rate of rotation of the steering wheel, control means for sensing a relationship of the vehicle relative to a reference outside of the vehicle and for effecting actuation of said valve means between the initial condition and said first and second actuated conditions independently of the steering wheel to maintain a predetermined relationship between the vehicle and the reference during movement of the vehicle relative to the reference, fluid pressure responsive means disposed adjacent to opposite end portions of said valve member for effecting movement of said valve member under the influence of fluid pressure conducted from said fluid metering means, and electrically actuated means disposed adjacent to opposite end portions of said valve member for effecting movement of said valve member in response to said control means.

15. A vehicle steering apparatus as set forth in claim 14 wherein said motor means including a cylinder and a piston movable within said cylinder for turning the steerable vehicle wheels, said vehicle steering apparatus including means for effecting operation of said valve means from an actuated condition to the initial condition in response to movement of said piston to an extent which is a function of the amount of metered fluid flow.

16. A vehicle steering apparatus comprising fluid motor means for turning steerable vehicle wheels, valve means operable from an initial condition to a first actuated condition to effect operation of said fluid motor means in a first direction to turn the steerable vehicle wheels in one direction and operable from the initial condition to a second actuated condition to effect operation of said fluid motor means in a second direction opposite to the first direction to turn the steerable vehicle wheels in another direction, means for providing fluid pressure to effect actuation of said valve means from the initial condition to the first actuated condition in response to rotation of a vehicle steering wheel in one direction and for providing fluid pressure to effect actuation of said valve means from the initial condition to the second actuated condition in response to rotation of the steering wheel in a direction opposite to the one direction of rotation, control means for sensing a relationship of the vehicle relative to a reference outside of the vehicle and for effecting actuation of said valve means between the initial condition and said first and second actuated conditions independently of the steering wheel to maintain a predetermined relationship between the vehicle and the reference during movement of the vehicle relative to the reference, and means for interrupting operation of said control means in response to rotation of the steering wheel during operation of said control means.

17. A vehicle steering apparatus as set forth in claim 16 wherein said valve means includes a valve member, a first actuator chamber disposed adjacent to a first end portion of said valve member for receiving fluid pressure from said means for providing fluid pressure to effect movement of said valve member and operation of said valve means from the initial condition to the first actuated condition, and a second actuator chamber disposed adjacent to a second end portion of said valve member for receiving fluid pressure from said means for providing fluid pressure to effect movement of said valve member and operation of said valve means from the initial condition to the second actuated condition, first electrical solenoid means disposed adjacent to the first end portion of said valve member and operable under the influence of said control means to effect movement of said valve member from the initial condition to one of said actuated conditions, and second electrical solenoid means disposed adjacent to the second end portion of said valve member and operable under the influence of said control means to effect movement of said valve member from the initial condition to another of said actuated conditions.

18. A vehicle steering apparatus as set forth in claim 16 further including clutch means connected with the steering wheel, said clutch means being operable between an engaged condition in which said clutch means is effective to transmit force between the steering wheel and said means for providing fluid pressure and a disengaged condition in which said clutch means is ineffective to transmit force between the steering wheel and said means for providing fluid pressure, said control means including means for maintaining said clutch means in the disengaged condition during operation of said control means to maintain the predetermined relationship between the vehicle and the reference.

19. A vehicle steering apparatus as set forth in claim 16 wherein said means for providing fluid pressure includes means for providing a metered fluid flow in an amount which is a function of the extent of rotation of the steering wheel.

20. A vehicle steering apparatus as set forth in claim 16 wherein said valve means includes a valve member having opposite end portions, fluid pressure activated means disposed adjacent to opposite end portions of said valve member for effecting movement of said valve member in response to fluid pressure conducted from said means for providing fluid pressure, and electrically actuated means disposed adjacent to opposite end portions of said valve member for effecting movement of said valve member in response to said control means.

21. A vehicle steering apparatus as set forth in claim 16 further including signal generator means connected with the steering wheel for providing an output signal in response to rotation of the steering wheel, said control means including means for rendering said control means ineffective to operate said valve means in response to a signal from said signal generator means.

* * * * *